(12) United States Patent
Meade et al.

(10) Patent No.: US 9,131,701 B2
(45) Date of Patent: Sep. 15, 2015

(54) DOUGH ROUNDER

(71) Applicant: Casa Herrera, Inc., Pomona, CA (US)

(72) Inventors: Ronald L. Meade, La Mirada, CA (US); Eric Anthony Villasenor, La Puente, CA (US)

(73) Assignee: Casa Herrera, Inc., Pomona, CA (US)

( * ) Notice: Subject to any disclaimer, the term of this patent is extended or adjusted under 35 U.S.C. 154(b) by 0 days.

(21) Appl. No.: 14/021,969

(22) Filed: Sep. 9, 2013

(65) Prior Publication Data

US 2014/0072667 A1  Mar. 13, 2014

Related U.S. Application Data

(60) Provisional application No. 61/698,111, filed on Sep. 7, 2012.

(51) Int. Cl.
*A21C 3/00* (2006.01)
*A21C 7/00* (2006.01)

(52) U.S. Cl.
CPC .... *A21C 3/00* (2013.01); *A21C 7/00* (2013.01)

(58) Field of Classification Search
USPC .......................................... 425/333
See application file for complete search history.

(56) References Cited

U.S. PATENT DOCUMENTS 5,714,178 A * 2/1998 Keener .......................... 425/333
2008/0160127 A1* 7/2008 Davis et al. ................... 425/239

* cited by examiner

*Primary Examiner* — Jacob Thomas Minskey
(74) *Attorney, Agent, or Firm* — Myers Andras LLP; Joseph C. Andras (57) ABSTRACT

A compact, rounding machine, or rounder, for quickly rounding dough units discharged from a divider into substantially round dough balls used to make products like flour tortillas, buns, rolls, etc. The rounder includes a stationary shoe having a curved inner face that curves partially around an axis of rotation, and a stationary groove having a substantially semi-circular profile and extending between an entry end and an exit end. A roller with an outer face and moving groove is positioned against the stationary shoe's inner face and stationary groove to define a rolling cavity, one half of the rolling cavity being formed by the stationary groove and another half of the rolling cavity is formed by the moving groove. A funnel assembly positioned adjacent to the roller, along with a beveled entry wall at the entry end of the stationary groove, guide dough units into the rolling cavity.

15 Claims, 9 Drawing Sheets

DOUGH ROUNDER

RELATED APPLICATIONS

This application claims the benefit of U.S. Provisional Patent Application Ser. No. 61/698,111, filed Sep. 7, 2012.

BACKGROUND OF THE INVENTION

1. Field of the Invention

This application relates generally to assembly line food production machinery and, more particularly, to rounding machines for rounding rough dough portions discharged from a divider into dough balls used to make products like flour tortillas, buns, rolls, etc.

2. Description of the Related Art

The industry has designed many different kinds of machines to make dough balls for producing products like flour tortillas, buns, rolls, etc. The task generally involves two successive operations: (1) dividing a large mass of dough into precise volumetrically sized dough portions or rough dough units; and (2) rounding the rough dough units into balls.

When the two tasks are accomplished by the same machine, it is sometimes called a "divider/rounder" machine, or simply a divider/rounder. When the dividing and rounding are accomplished by using separate, physically and visually distinct machines, as one would guess the two machines are often called a "divider" and a "rounder," and together they form a divider/rounder system. Regardless of the configuration or name given, the ultimate goal of a divider/rounder machine or divider/rounder system is the creation of round dough balls that contain a very precise amount of dough by volume and weight.

Dividers

There are many different types of dividers. Two that are often used in the assembly line production of tortillas are piston-type dividers and extrusion-type dividers.

Piston-type dividers have been known for some time. In a high speed production environment, the divider has a plurality of pistons and the pistons are usually located in a rotating drum assembly that is located at the bottom of a hopper containing a mass of dough. The rotating drum assembly has a chambered area that contains a row of piston/cylinders pairs that divide dough portions from the mass of dough held within the hopper. The divider operates by rotating the drum assembly until its chambered area is in contact with the mass of dough, drawing dough into the cylinders by moving the pistons inward, rotating the drum to move the chambered area away from the hopper to a discharge area, and then moving the pistons outward to expel rough units of dough from the cylinders. U.S. Pat. No. 2,858,775, U.S. Pat. No. 4,338,341 and U.S. Pat. No. 4,668,174 are examples of piston-type dividers, and are hereby incorporated by reference.

Extrusion-type dividers are also well known. In a typical extrusion-type divider, a mass of dough is extruded into a plurality of streams and, as the extruded streams of dough flow forward, they are cut into rough units of dough by a suitable cutting mechanism, e.g. a blade that reciprocates back and forth, or a wire that is held taut within a frame that rotates round and round. U.S. Pat. No. 4,948,611, U.S. Pat. No. 4,960,601, and U.S. Pat. No. 5,110,610 are examples extrusion-type dividers, and are hereby incorporated by reference.

Rounders

There are also many types of rounders that are an integral part of the various prior art divider/rounders, or are provided separately and used in close association with the prior art dividers.

One earlier approach to rounding an array of rough dough units located on an indexed conveyor belt that stops and starts involved the lowering of a frame carrying a corresponding array of hemispherical cups over the dough units while the belt is stopped, rapidly moving the array of cups in a horizontally circular motion to mould the dough units into dough balls, and then lifting the array of cups upward so that the conveyor could move dough balls further downstream. The conveyor belt and array of cups collectively formed a rounding table.

Another common approach to rounding that works with a continuously moving conveyor belt, rather than an indexed conveyor, involves a rounding bar that is held at a slight angle just above the continuously moving conveyor belt. In a large quantity production environment that deals with a plurality of rough dough units that are simultaneously created and advanced together, in parallel, the rounder has a corresponding plurality of rounding bars, one rounding bar per rough unit of dough, that are also arranged in parallel. The rounding bars and conveyor belt also form a rounding table. In operation, the dough portions are advanced forward on the conveyor of the rounding table and, when they come into contact with a corresponding rounding bar, are rolled against the rounding bar due to the relative movement of the conveyor belt and rotated into the shape of a ball. U.S. Pat. Nos. 2,858, 775; 3,311,068; 3,448,697; 4,008,025; 4,306,850; 4,338,341; 4,391,576; 4,668,174; 4,948,611; 5,110,610; 5,264,232; 5,270,070; 5,356,652; 5,714,178; 5,750,169; 5,786,016; 6,159,517; and 6,303,168 are examples rounding bars, and are hereby incorporated by reference.

Exemplary Tortilla Production Environment

In the mass production of pressed flour tortillas, the divider/rounder system makes the rough dough units and then forms them into dough balls, in parallel, in order to continuously create row after row of dough balls (e.g. 4, 6, 8, 9, or 10-across). The dough balls are moved forward, still in rows, to downstream equipment that continues to process them into tortillas. The typical equipment includes a dough relaxation conveyor called "proofer", a tortilla press, an oven, a cooling conveyor, a stacking station, and a packaging station.

The tortilla press compresses the dough balls into thin tortillas of relative large diameter when compared to the original diameter of the dough balls. As a result, non-spherical dough balls results in non-circular tortillas and a general lack of uniformity from tortilla to tortilla. Unfortunately, rounding bars tend to form somewhat egg-shaped dough balls.

In addition, due to the consecutive pieces of equipment, a production tortilla line can require a great deal of floor space. Unfortunately, a rounder that uses rounding bars tends to consume a fair amount of that horizontal floor space.

There remains a need, therefore, for an improved dough rounder that receives rough dough units from a divider and quickly and efficiently produces a plurality of very round dough balls, in parallel, and in a quick and space-efficient manner.

SUMMARY OF THE INVENTION

In one aspect, the invention resides in a dough ball rounder for quickly transforming a dough unit into a substantially round dough ball, comprising a central shaft that rotates about an axis of rotation; a stationary shoe with a curved inner face that curves partially around the axis of rotation, and a stationary groove having a substantially semicircular profile that extends radially outward from the curved inner face and concentrically along the curved inner face between an entry end and an exit end; a roller that is connected to the central shaft and rotates about the axis of rotation, the roller having an external face with a moving groove having a substantially semicircular profile that extends radially inward from the roller's external face and concentrically around the roller's periphery, the roller's external face closely fitting against the stationary shoe's curved inner face, and the roller's moving groove mating with the stationary shoe's stationary groove and defining a rolling cavity therebetween where one half of the rolling cavity is formed by the stationary groove and another half of the rolling cavity is formed by the moving groove; and a motor for rotating the central shaft and the roller connected thereto relative to the stationary shoe for rotating the moving groove toward the stationary groove at the entry end of the stationary groove.

A beveled entry wall may be provided at the entry end of the stationary groove for guiding a dough unit into the rolling cavity, the dough ball rounder pulling a dough unit positioned adjacent to the beveled entry wall into the rolling cavity at the entry end of the stationary groove, rolling the dough unit into a substantially round dough ball within the rolling cavity, and ejecting the substantially round dough ball from the exit end of the stationary groove.

A funnel assembly may be positioned adjacent to the roller, the funnel assembly having an enlarged opening for receiving a dough unit and comprising a side skirt that extends downward to guide the dough unit into the rolling cavity defined between the moving groove and the stationary groove.

Other aspects and advantages of the present invention will become apparent from the following detailed description, which, when taken in conjunction with the drawings, illustrate by way of example the principles of the invention.

DETAILED DESCRIPTION OF THE PREFERRED EMBODIMENTS

The presently preferred embodiment resides in a rounder that would mount directly below a divider that outputs rough dough units 11 (schematically shown in FIG. 1), the rounder making dough balls 13 (also shown in FIG. 1) that drop through a timing gate into a proofer. Many of the figures are directed to a prototype embodiment that includes a single rounding drum, but the preferred embodiment will have the same number of rounding drums as there are ports on the divider, as discussed below.

Figure 1:
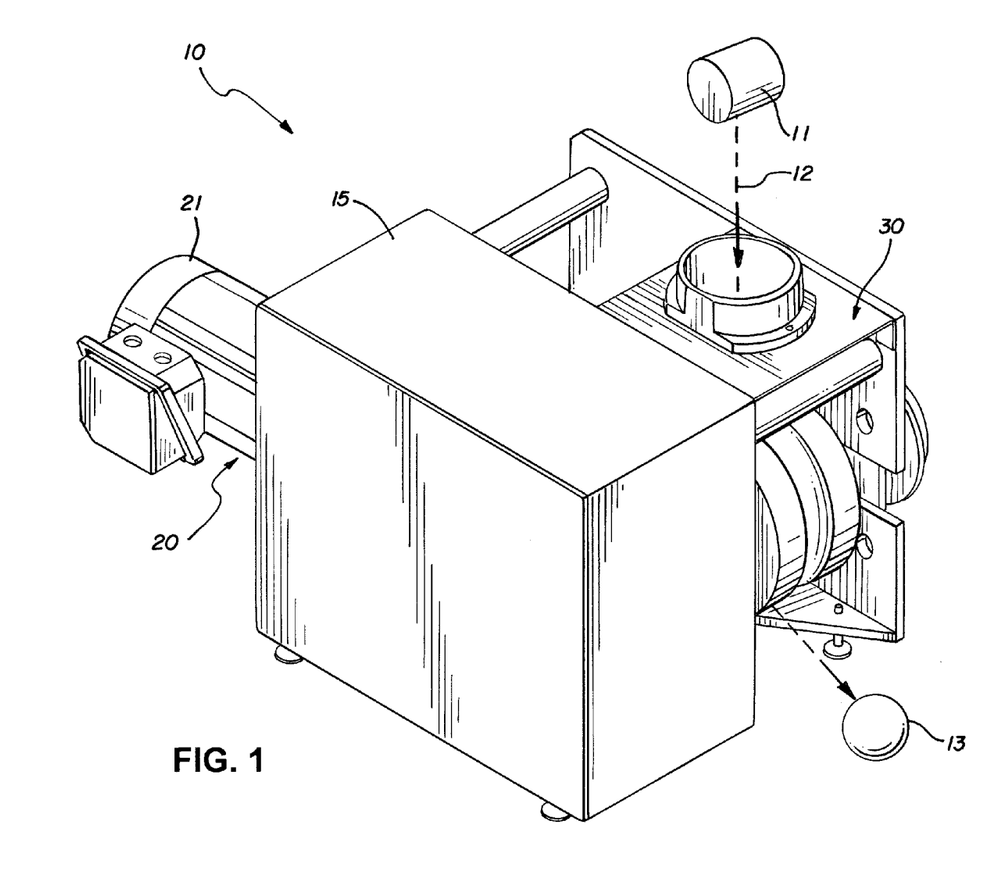
FIG. 1 is a perspective view of a prototype rounder 10 according to a presently preferred embodiment of the invention.

FIG. 1 is a perspective view of a prototype rounder 10 according to a presently preferred embodiment of the invention. As shown, the rounder 10 generally comprises a drive assembly 20 (partially hidden beneath a cover 15) and a former assembly 30. In operation, the rounder 10 receives a dough chunk 11 and rapidly forms it into a dough ball 13 as it is processed through the former assembly 30. The prototype rounder 10 has only one process path 12, but a production version would include as many production paths 12 as are required to form the dough chunks 11 being output in parallel by the divider (not shown) into corresponding dough balls 13.

Figure 2:
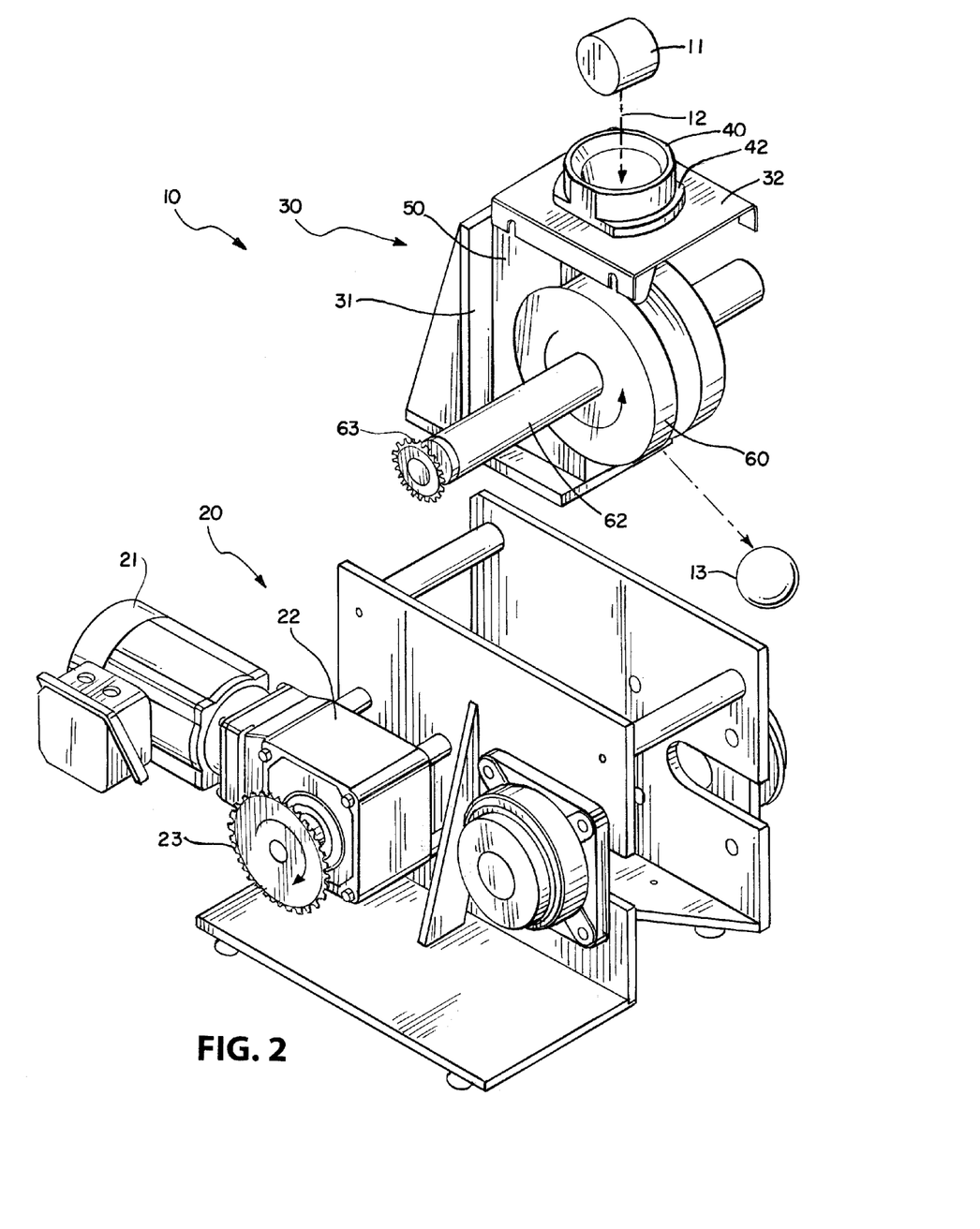
FIG. 2 is a partially-exploded perspective view of the prototype rounder 10 of FIG. 1, with the cover omitted, and showing how the prototype rounder 10 comprises a drive assembly 20 and a former assembly 30.

FIG. 2 is a partially-exploded perspective view of the prototype rounder 10 of FIG. 1, with the cover 15 omitted, and more clearly showing the former assembly 30 physically separated from the drive assembly 20. The preferred former assembly 30 comprises a mounting plate 31, a funnel assembly 40, a grooved shoe 50, and a grooved roller 60 that rotates against or closely adjacent to the shoe 50. The roller 60 is mounted on a shaft 62 having an input gear 63 on one of its ends.

As shown in FIG. 2 without the cover 15 present, the drive assembly 20 generally comprises the motor 21, a gear box 22 that is driven by the motor 21, and an output gear 23 extending from the gear box 22. The output gear 23 meshes with the gear 63 on the shaft 62, thereby rotating the grooved roller 60 in a counter-clockwise direction as suggested by the arrow.

Figure 3:
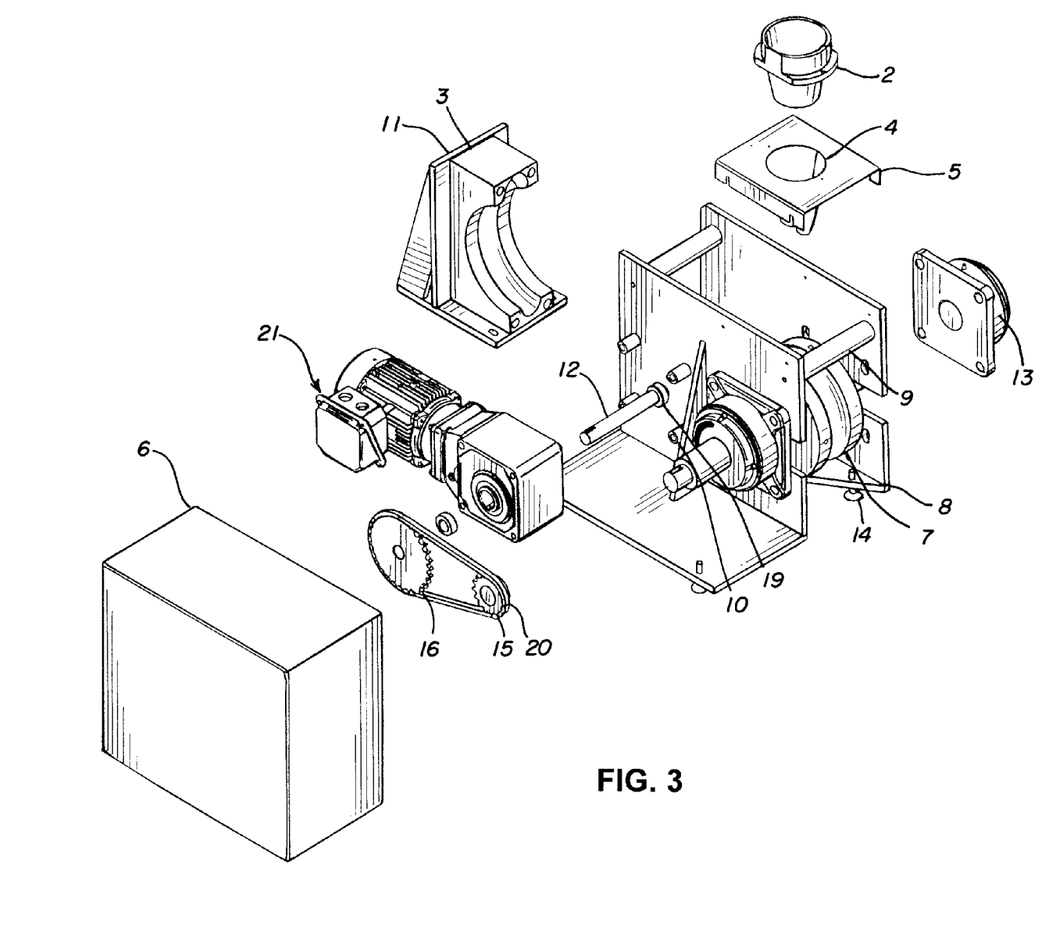
FIG. 3 is an exploded perspective drawing of an earlier version of the prototype rounder 10 of FIG. 1.

FIG. 3 is an exploded perspective drawing of an earlier version of the entire prototype rounder 10. The numbers on this drawing do not match those used elsewhere in this application, but the overall drawing provides information concerning its overall assembly, its construction, and its operation. A notable difference between this earlier version and the presently preferred version is that the funnel assembly in the earlier version does not include the side skirt. Also, here the gears are driven with a belt or chain, rather than by meshing together.

Figure 4:
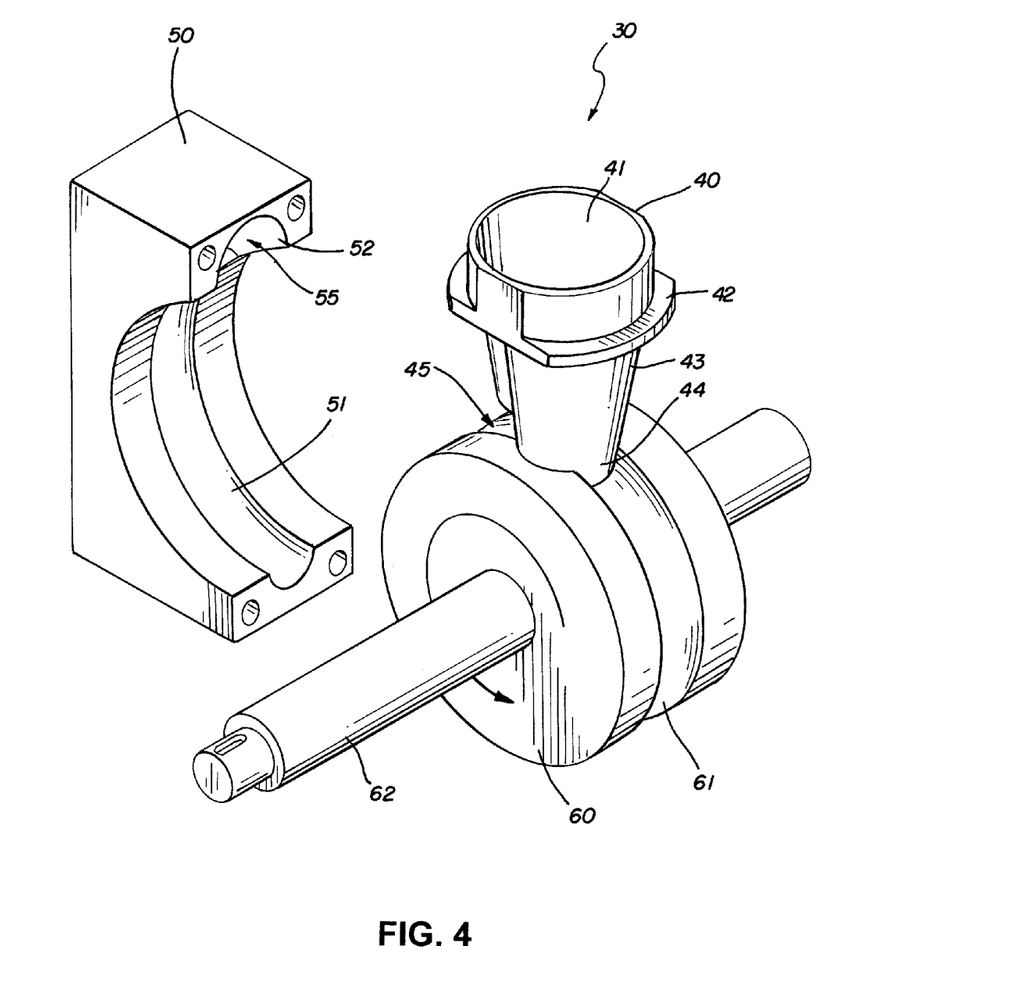
FIG. 4 is an exploded perspective view of the former assembly 30.

FIG. 4 is an exploded perspective view of the former assembly 30 of FIGS. 1 and 2. As shown, the preferred former assembly is comprised of a funnel assembly 40, a grooved shoe 50, and a grooved roller 60 that rotates against or closely adjacent to the shoe 50.

As shown, the grooved shoe 50 includes a groove 51 with a substantially semicircular profile, and the grooved roller 60 also includes a groove 61 with a substantially semicircular profile. The shoe 50 is stationary while the roller 60 rotates in the direction shown by the arrow. The shoe 50 further features an open sided funnel portion 52 that is formed from a beveled entry wall 52 and a side opening 55. The beveled entry wall 52 helps guide dough chunks 11 being moved by the groove 61 into the facing groove 51.

The preferred funnel assembly 40 includes an enlarged opening 41 to help gather that dough chunks 11 (see FIGS. 1 and 2) that are expelled by the divider (not shown). A flange 42 is used to mount the funnel assembly 40 to a mounting plate 32 (see FIG. 2). The funnel assembly 40 also includes a side skirt 43 that extends downwardly from the enlarged opening 41. The side skirt 43 has a curved bottom 44 that fits within the groove 61 of the grooved roller 60, and a side opening 45 that opens in the direction the dough chunk 11 would travel once it makes contact with the groove 61. The curved bottom 44 prevents the dough chunk 11 from falling into the groove 61 when it first passed through the funnel assembly 40, and the side opening 45 permits the dough chunk 11 to travel with the roller 60 as it rotates toward the beveled wall 52 at the top of the groove 51 in the grooved shoe 50.

The funnel assembly 40 beneficially guides the dough chunk 11 into the grooves 51, 61 of the shoe 50 and roller 60, respectively. As a result, the funnel assembly 40 permits the overall rounder 10 to be positioned at the discharge end of a divider. When the divider is producing multiple dough chunks 11 for delivery to multiple grooves 51, 61, in parallel, It may be desirable to temporarily catch the dough chunks 11 in an intermediate assembly of one kind or another in order to release them to the rounder 10 at precisely the same time— thereby causing the dough balls 13 to emerge simultaneously.

Figure 5:
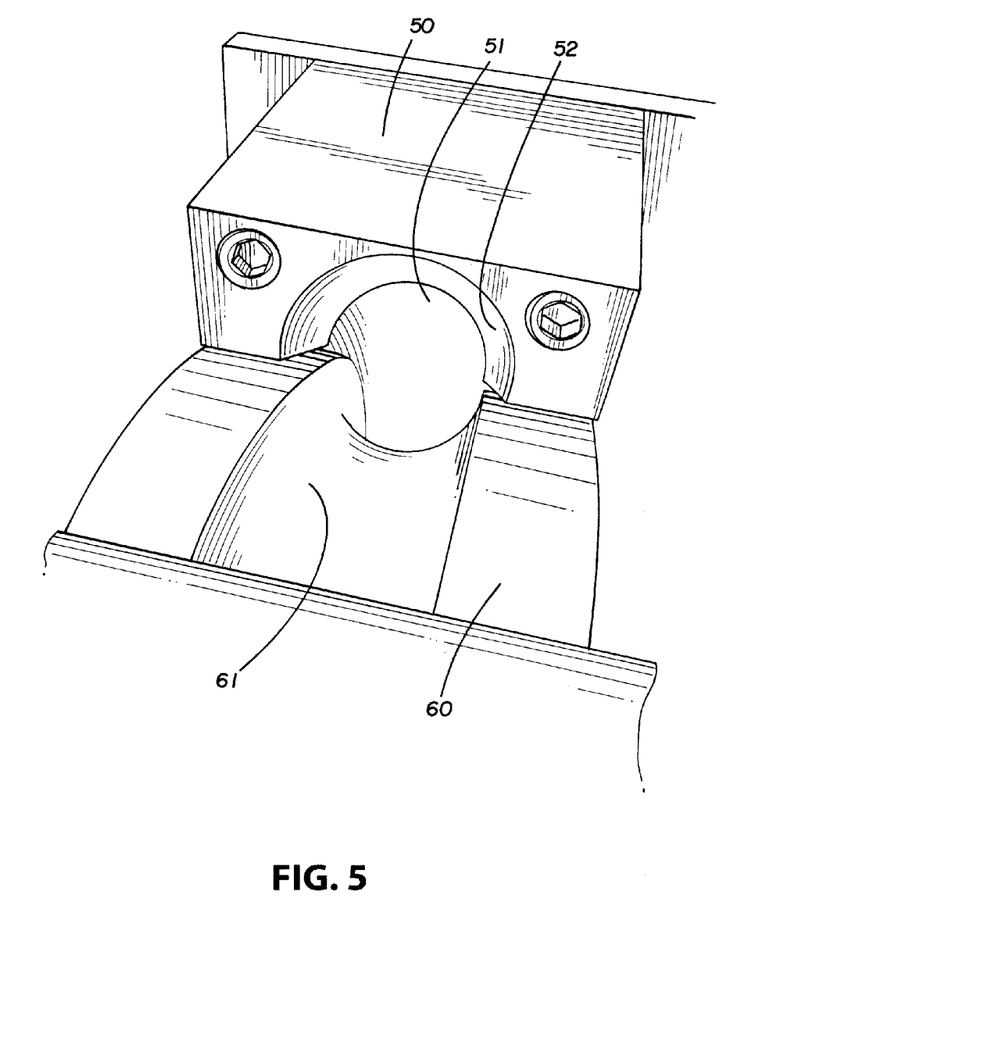
FIG. 5 is a close-up photograph of the interface between the shoe 50 and the roller 60, with the funnel assembly 40 removed.

FIG. 5 is a close-up photograph of the interface between the shoe 50 and the roller 60, with the funnel assembly 40 removed. As shown, the shoe's groove 51 and the roller's groove 61 face one another to form a circular cavity. The shoe groove 51 is stationary and the roller groove 61 is rotating inwardly toward the groove 50 as viewed here. As a result, a rough dough unit located in the this area will get pulled into the circular cavity and, because one half of that cavity is stationary and one half is moving, will be spun around and formed into the shape of a ball. The beveled wall 52 that leads into the forming cavity helps guide the rough dough units so that they go right in and do not cavitate.

Figure 6:
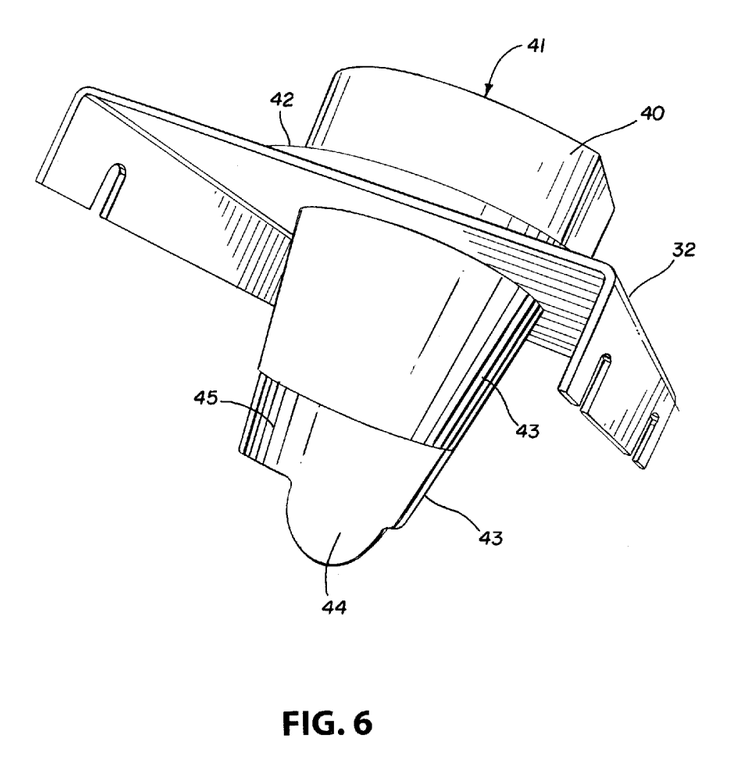
FIG. 6 is a perspective view of the funnel assembly 40.

FIG. 6 is a perspective view of the funnel assembly 40 showing the presently preferred configuration of the side skirt 43, its curved bottom 44, and its side opening 45.

Figure 7:
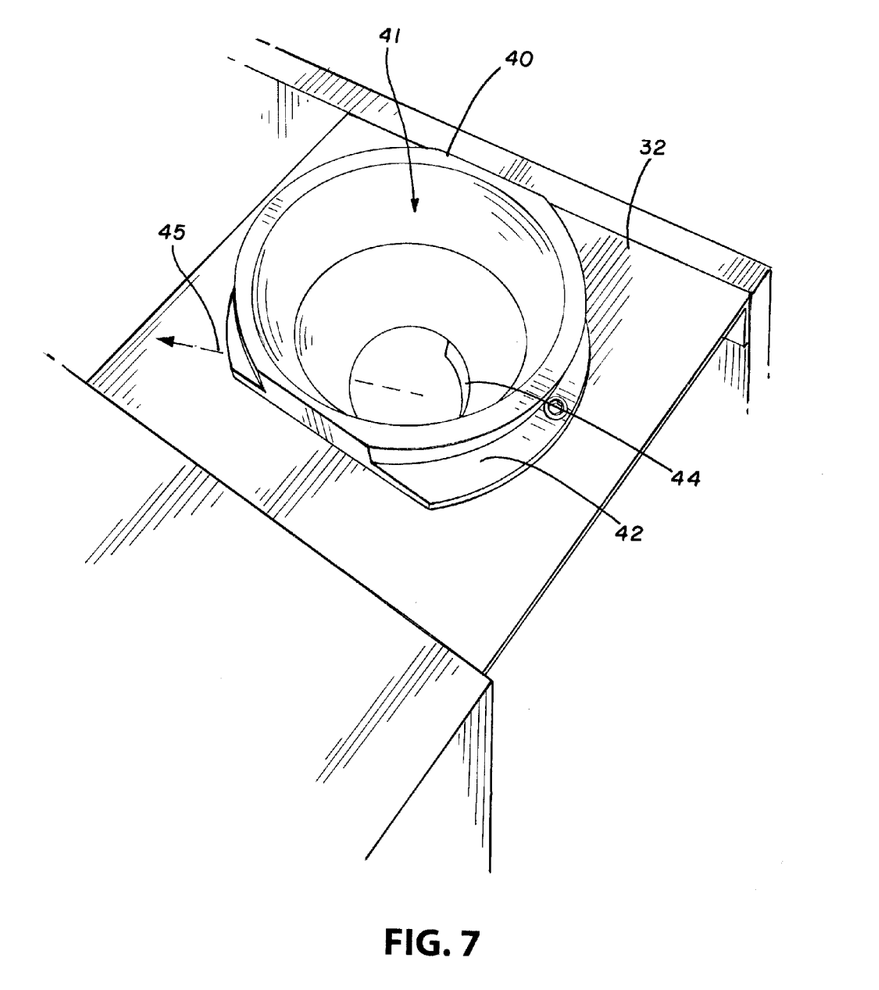
FIG. 7 is a top view of the funnel assembly 40.

FIG. 7 is a top view of the funnel assembly 40 showing how the enlarged entry 41 tapers downward toward the bottom of the assembly. And, down at the bottom of the assembly, one finds the curved bottom 44 of the side skirt 43 (see FIGS. 4 and 6) that fits within the groove 61 of the grooved roller 60, and the side opening 45 (represented here by the dashed arrow) that opens in the direction the dough chunk 11 would travel once it makes contact with the groove 61.

Figure 8:
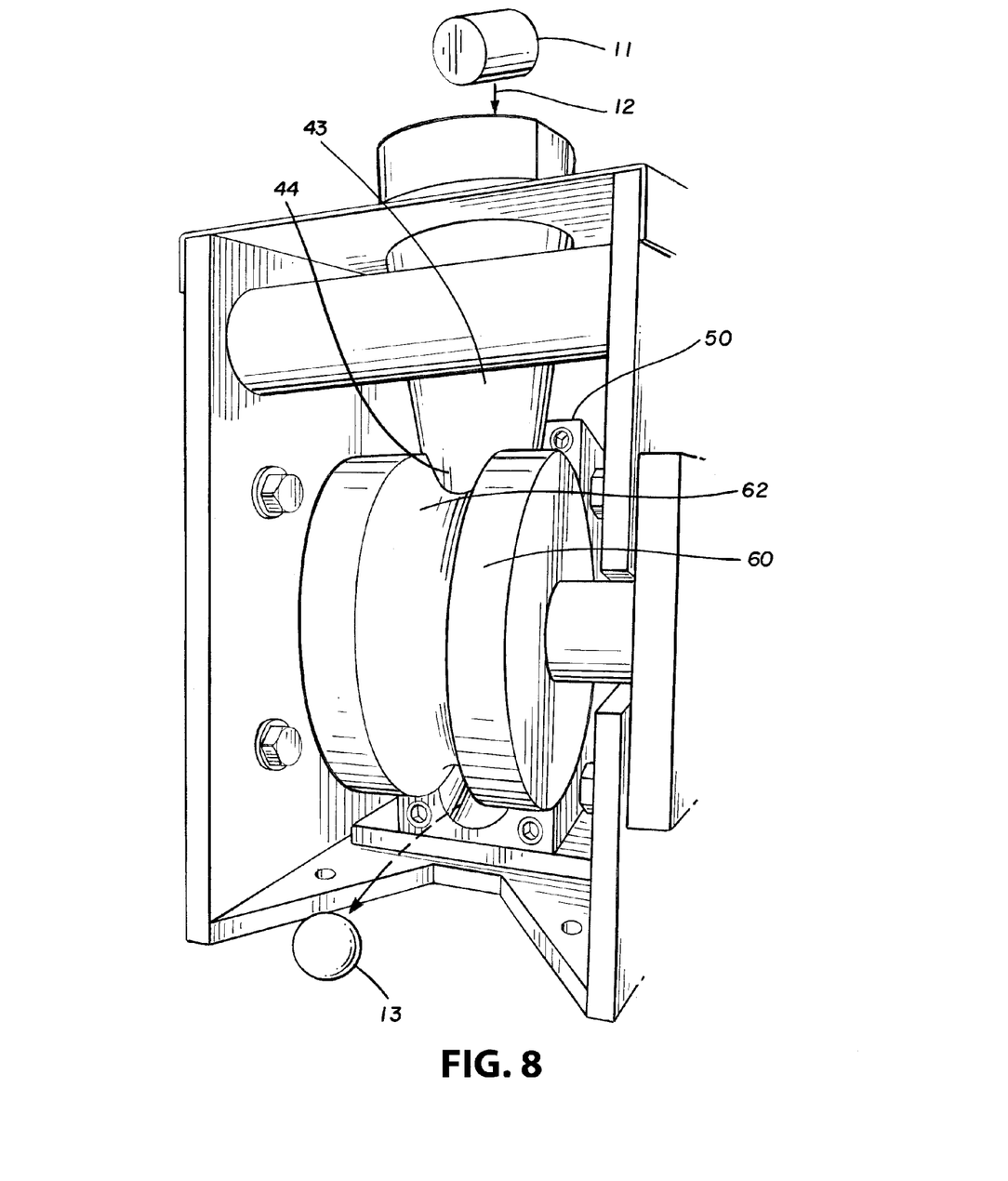
FIG. 8 is a side view of the lower half of the funnel assembly 40, the roller 60, and the grooved shoe 50, showing how a rough dough unit 11 dropped into the funnel assembly will travel through the rounder assembly and emerge as a dough ball 13.

FIG. 8 is a side view of the lower half of the funnel assembly 40, the roller 60, and the grooved shoe 50, showing how a rough dough unit 11 dropped into the funnel assembly will travel through the rounder assembly and emerge as a dough ball 13.

As mentioned earlier, the preferred embodiment of a rounder made according to the principles of this invention will have as many rounding drums as there are output ports on the associated divider that feeds it.

Figure 9:
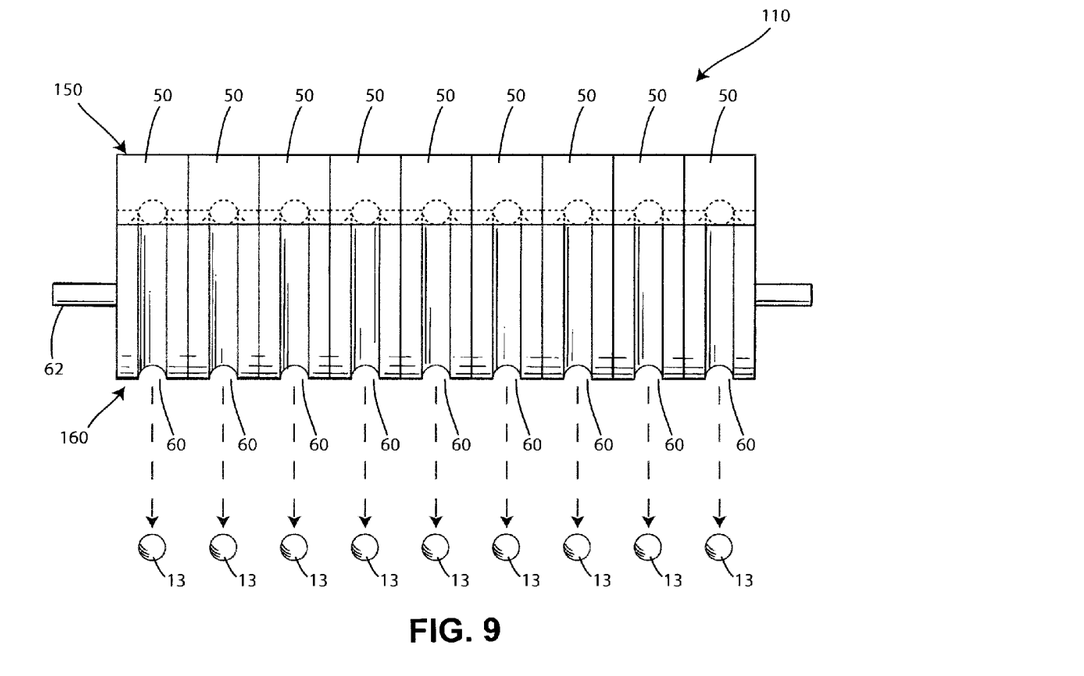
FIG. 9 is a schematic top plan view of a rounder 110 comprised of a roller module 160 formed from nine grooved rollers 60 mounted on a common shaft 62 and a stationary shoe module 150 formed from nine grooved shoes 50.

FIG. 9 is a schematic top plan view of a rounder 110 formed from a roller module 160 formed from nine grooved rollers 60 mounted on a common shaft 62 and a stationary shoe module 150 formed from nine grooved shoes 50. In this ganged-together arrangement, the divider 110 can be simultaneously fed a succession of rough dough chunks (not shown) to simultaneously produce nine dough balls 13. The actual number of grooved shoes 50 and grooved rollers 60 could vary, of course, depending on the number of dough balls 13 to be produced. Here, the shoes 50 are provided as separate, one-path units that are ganged together on a bracket (not shown) and the rollers 60 are similarly provided as separate units that are ganged together on the shaft 62.

Figure 10:
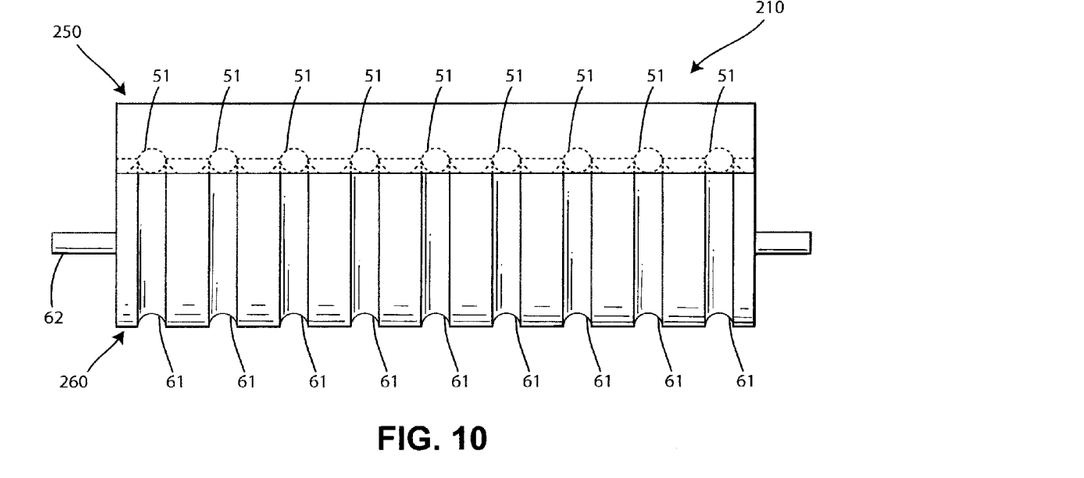
FIG. 10 is a schematic top plan view of a rounder 210 formed from a single shoe 150 having nine integral grooves 51 and a single roller 260 having nine integral grooves 61.

FIG. 10 is a schematic top plan view of a rounder 210 formed from a single shoe 150 having nine integral grooves 51, and from a single roller 260 having nine integral grooves 61. In such case, the shoe 250 and roller 260 would likely be formed from integral blocks of material (e.g. UHMW polyethylene). The prototype presently uses UHMW for both the shoe 50 and the roller 60, but it is anticipated that dissimilar materials may be preferred because UHMW has a relatively high coefficient of friction when rubbed against another piece of UHMW.

We claim:

1. A dough ball rounder for quickly transforming a dough unit into a substantially spherical dough ball, comprising:
   a central shaft that rotates about an axis of rotation;
   a stationary shoe with a curved inner face that curves partially around the axis of rotation, and a stationary groove having a substantially semicircular profile that extends radially outward from the curved inner face and concentrically along the curved inner face between an entry end and an exit end;
   a roller that is connected to the central shaft and rotates about the axis of rotation through multiple revolutions, the roller having an external face with a moving groove having a substantially semicircular profile that extends radially inward from the roller's external face and concentrically around the roller's periphery, the roller's external face closely fitting against the stationary shoe's curved inner face, and the roller's moving groove mating with the stationary shoe's stationary groove and defining a rolling cavity therebetween where one half of the rolling cavity is formed by the stationary groove and another half of the rolling cavity is formed by the moving groove;
   a motor for rotating the central shaft and the roller connected thereto through multiple revolutions relative to the stationary shoe for rotating the moving groove toward the stationary groove at the entry end of the stationary groove;
   a beveled entry wall at the entry end of the stationary groove for guiding a dough unit into the rolling cavity, the dough ball rounder pulling a dough unit positioned adjacent to the beveled entry wall into the rolling cavity at the entry end of the stationary groove, rolling the dough unit into a substantially spherical dough ball within the rolling cavity, and ejecting the substantially spherical dough ball from the exit end of the stationary groove.

2. The dough ball rounder of claim 1 further comprising:
   a funnel assembly positioned adjacent to the roller, the funnel assembly having an enlarged opening for receiving a dough unit and comprising a side skirt that extends downward to guide the dough unit into the rolling cavity defined between the moving groove and the stationary groove.

3. The dough ball rounder of claim 2 further comprising:
   a side tab that extends from the side skirt at least partially into the roller's moving groove in order to prevent the dough unit from going past the side tab and a side opening in the side skirt that is positioned opposite to the side tab and permits the dough unit to move toward the rolling cavity.

4. The dough ball rounder of claim 1 further comprising:
a plurality of stationary grooves and a plurality of moving grooves that form a corresponding plurality of rolling cavities.

5. The dough ball rounder of claim 4 wherein the moving grooves are formed in a plurality of rollers that are ganged together on a common shaft.

6. The dough ball rounder of claim 1 further comprising:
a plurality of stationary shoes that each have a stationary groove and a plurality of rollers that each have a moving groove to form a corresponding plurality of rolling cavities for producing a corresponding plurality of dough balls in parallel.

7. The dough ball rounder of claim 1 wherein the entry end of the stationary groove is located above the central shaft's axis of rotation, and wherein the exit end of the stationary groove is located below the central shaft's axis of rotation.

8. The dough ball rounder of claim 1 wherein the stationary shoe and the moving roller are formed from UHMW polyethylene.

9. A dough ball rounder for quickly transforming a dough unit into a substantially spherical dough ball, comprising:
a central shaft that rotates about an axis of rotation;
a stationary shoe with a curved inner face that curves partially around the axis of rotation, and a stationary groove having a substantially semicircular profile that extends radially outward from the curved inner face and concentrically along the curved inner face between an entry end and an exit end;
a roller that is connected to the central shaft and rotates about the axis of rotation through multiple revolutions, the roller having an external face with a moving groove having a substantially semicircular profile that extends radially inward from the roller's external face and concentrically around the roller's periphery, the roller's external face closely fitting against the stationary shoe's curved inner face, and the roller's moving groove mating with the stationary shoe's stationary groove and defining a rolling cavity therebetween where one half of the rolling cavity is formed by the stationary groove and another half of the rolling cavity is formed by the moving groove;
a motor for rotating the central shaft and the roller connected thereto through multiple revolutions relative to the stationary shoe for rotating the moving groove toward the stationary groove at the entry end of the stationary groove; and
a funnel assembly positioned adjacent to the roller, the funnel assembly having an enlarged opening for receiving a dough unit and comprising a side skirt that extends downward to guide the dough unit into the rolling cavity defined between the moving groove and the stationary groove, the dough ball rounder pulling a dough unit into the rolling cavity at the entry end of the stationary groove, rolling the dough unit into a substantially spherical dough ball within the rolling cavity, and ejecting the substantially spherical dough ball from the exit end of the stationary groove.

10. The dough ball rounder of claim 9 further comprising:
a beveled entry wall at the entry end of the stationary groove for guiding a dough unit into the rolling cavity.

11. The dough ball rounder of claim 9 further comprising:
a plurality of stationary grooves and a plurality of moving grooves that form a corresponding plurality of rolling cavities.

12. The dough ball rounder of claim 11 wherein the moving grooves are formed in a plurality of rollers that are ganged together on a common shaft.

13. The dough ball rounder of claim 9 further comprising:
a plurality of stationary shoes that each have a stationary groove and a plurality of rollers that each have a moving groove to form a corresponding plurality of rolling cavities for producing a corresponding plurality of dough balls in parallel.

14. The dough ball rounder of claim 9 wherein the entry end of the stationary groove is located above the central shaft's axis of rotation, and wherein the exit end of the stationary groove is located below the central shaft's axis of rotation.

15. The dough ball rounder of claim 9 wherein the stationary shoe and the moving roller are formed from UHMW polyethylene.

* * * * *